No. 760,079. PATENTED MAY 17, 1904.
F. A. OVERDIER.
TROLLEY.
APPLICATION FILED JUNE 30, 1903.
NO MODEL.

Witnesses:
Louis D. Heinrichs
L. A. Momsen

Inventor
Frank A. Overdier
By _____ Atty

No. 760,079. Patented May 17, 1904.

UNITED STATES PATENT OFFICE.

FRANK A. OVERDIER, OF COLUMBUS, OHIO.

TROLLEY.

SPECIFICATION forming part of Letters Patent No. 760,079, dated May 17, 1904.

Application filed June 30, 1903. Serial No. 163,825. (No model.)

*To all whom it may concern:*

Be it known that I, FRANK A. OVERDIER, a citizen of the United States, residing at Columbus, county of Franklin, and State of Ohio, have invented a certain new and useful Improvement in Trolleys, of which the following is a specification.

My invention relates to a new and useful improvement in trolleys, and has for its object to provide a trolley in which the wheels will stay upon the wires at all times; and a further object of my improvement is to allow for the trolley-wheels to stay in alinement with a wire even when the pole is at an angle thereto.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompaning drawings, forming a part of this specification, in which—

Figure 1:
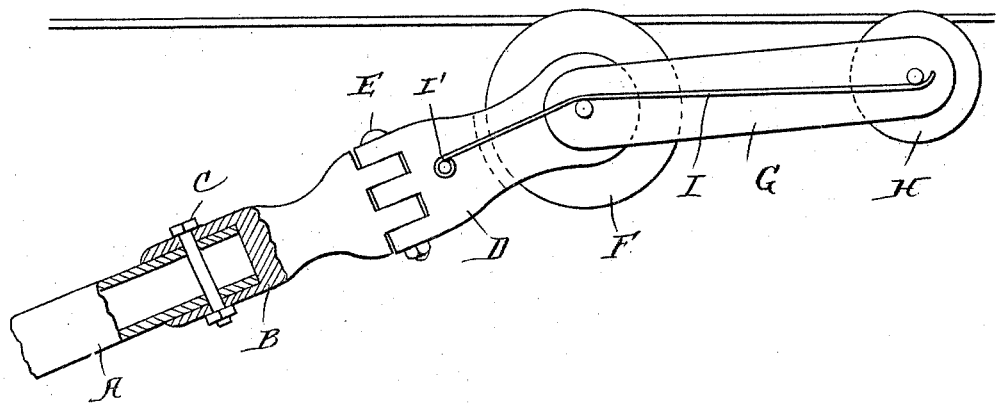
Figure 2:
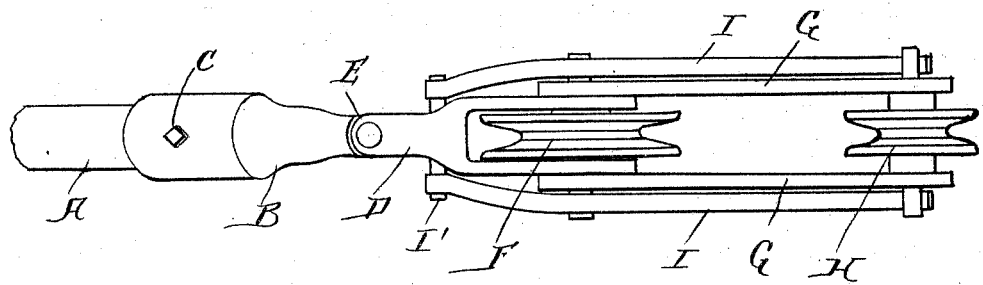

Figure 1 is a side elevation of my improved trolley; Fig. 2, a plan view of the same.

My improved trolley may be secured to any ordinary trolley-pole by cutting off the pole just behind the trolley-harp.

A represents the trolley-pole, and the trolley is provided with a socket B, which fits over the end of the pole and is secured thereto by a bolt or pin C passing through the socket and through the pole.

D is the trolley-harp, which is hinged at the point E to that part of the trolley to which the socket B is secured. The pintle of the hinge extends at right angles to the trolley-pole.

F is the ordinary trolley-wheel, journaled in the harp D, and thus by means of the hinge E the wheel F may be turned to follow the wire even if the trolley-pole is at an angle thereto, and by hinging the trolley-wheel to the pole the wheel is not so liable to leave the wire, as it is free to adapt itself to the irregularities of the wire, which are a frequent cause of the wheels leaving the same.

G represents links pivoted at one end upon the spindle of the wheel F. Outside of the trolley-harp and between the other ends of the links, which extend out beyond the trolley-wheel F, is journaled a small trolley-wheel H. The spindles of the wheels F and H extend each side a distance beyond the links G.

I represents flat springs secured at the point I' to a pin extending through the trolley-harp back of the wheel F, and these springs then extend over the spindles of the wheel F, and the free ends of the springs lie underneath the ends of the spindles of the wheel H. Thus these springs always tend to keep the small trolley-wheel H in contact with the trolley-wire.

By providing a double-wheel trolley in this manner it will be seen that if the wheel F is thrown downward the spring I will force the wheel H upward, so as to cause it to remain in contact with the wire, and this wheel H remaining in contact with the wire will guide the wheel F as it springs upward, so as to cause it to resume its normal position, and as the two wheels are separated some distance by the links G no irregularities or hangers at the corners can operate so as to displace both wheels at the same time, and as one wheel will always be in contact with the wire it will act to guide the other wheel back into place, and on account of one wheel always being in contact with the wire sparking will be done away with, which is very injurious to the wire and connections.

Another advantage of my improvement is that the sparking or arcing between the trolley and the trolley-wire will be done away with, thereby making a saving to the company of the current, which will be a great benefit, and this saving of power will in time pay for an attachment to the trolley.

Of course I do not wish to be limited to the exact construction here shown, as slight modifications could be made without departing from the spirit of my invention.

Having thus fully described my invention, what I claim as new and useful is—

In combination in a trolley, a trolley-pole, an attachment provided with a socket adapted to fit over the end of the trolley-pole and be secured thereto, a trolley-harp hinged to said attachment, the pintle of the hinge extending at right angles to the pole in a vertical direction, a main trolley-wheel pivoted in the trolley-harp, two links, the inner ends of which are pivoted to the spindle of the main trolley-wheel upon each side of the harp, a supplementary trolley-wheel pivoted between the outer ends of the links, springs arranged upon each side of the links and secured at one end to the trolley-harp, said springs passing over the ends of the spindle of the main trolley-wheel, and the free ends of the springs coming in contact underneath the ends of the spindle of the supplementary wheel so as to force said wheel upward, as specified.

In testimony whereof I have hereunto affixed my signature in the presence of two subscribing witnesses.

FRANK A. OVERDIER.

Witnesses:
BARTON GRIFFITH,
CHAS. F. NINDS.